(12) United States Patent
Wu

(10) Patent No.: US 11,212,501 B2
(45) Date of Patent: Dec. 28, 2021

(54) PORTABLE DEVICE AND OPERATION METHOD FOR TRACKING USER'S VIEWPOINT AND ADJUSTING VIEWPORT

(71) Applicant: Sung-Yang Wu, Hsinchu (TW)

(72) Inventor: Sung-Yang Wu, Hsinchu (TW)

( * ) Notice: Subject to any disclaimer, the term of this patent is extended or adjusted under 35 U.S.C. 154(b) by 0 days.

(21) Appl. No.: 17/184,479

(22) Filed: Feb. 24, 2021

(65) Prior Publication Data

US 2021/0185292 A1 Jun. 17, 2021

Related U.S. Application Data

(62) Division of application No. 15/368,693, filed on Dec. 5, 2016, now abandoned.

(51) Int. Cl.
| | | |
|---|---|---|
| *G06F 3/01* | (2006.01) | |
| *H04N 13/117* | (2018.01) | |
| *H04N 13/204* | (2018.01) | |
| *H04N 13/30* | (2018.01) | |
| *H04N 5/262* | (2006.01) | |
| *H04N 7/18* | (2006.01) | |

(52) U.S. Cl.
CPC ........... *H04N 13/117* (2018.05); *G06F 3/013* (2013.01); *H04N 5/2628* (2013.01); *H04N 7/185* (2013.01); *H04N 13/204* (2018.05); *H04N 13/30* (2018.05)

(58) Field of Classification Search
CPC ...................................................... G06F 3/013
See application file for complete search history.

(56) References Cited

U.S. PATENT DOCUMENTS

| | | | |
|---|---|---|---|
| 8,704,879 | B1 | 4/2014 | Cheng |
| 2008/0136916 | A1 | 6/2008 | Wolff |
| 2013/0135295 | A1 | 5/2013 | Li |
| 2015/0062536 | A1 | 3/2015 | Auger |
| 2016/0078680 | A1 | 3/2016 | Reif |

FOREIGN PATENT DOCUMENTS

| | | |
|---|---|---|
| CN | 102314856 A | 1/2012 |
| CN | 103531094 | 1/2014 |
| CN | 104539924 A | 4/2015 |
| TW | I369636 | 8/2012 |
| TW | I540880 | 7/2016 |

*Primary Examiner* — Y Lee
*Assistant Examiner* — Young Lee
(74) *Attorney, Agent, or Firm* — Winston Hsu

(57) ABSTRACT

A portable device includes a display module, an image capture module, and an eye-tracking module. The image capture module is used to capture images steadily. The eye-tracking module is used to track a user's viewpoint position relative to the portable device. Viewport within the images captured by the image capture module is adjusted in accordance with the user's viewpoint position for generating modified images displayed on the display module instantaneously. The modified images shown on the display module can fit the background scene seen by the user, and the augmented reality experience on the portable device may be improved accordingly.

1 Claim, 4 Drawing Sheets

PORTABLE DEVICE AND OPERATION METHOD FOR TRACKING USER'S VIEWPOINT AND ADJUSTING VIEWPORT

CROSS REFERENCE TO RELATED APPLICATIONS

This application is a division of application Ser. No. 15/368,693 filed on Dec. 5, 2016, which is incorporated by reference herein in its entirety.

BACKGROUND OF THE INVENTION

1. Field of the Invention

The present invention relates to a portable device and an operation method thereof, and more particularly, to a portable device including an image capture module and a display module and an operation method thereof.

2. Description of the Prior Art

In recent years, portable devices, such as smart phones, tablets, handheld game consoles, and car navigation systems, become popular because of the lightweight and compact displays and other additional features, such as wireless internet connection and image capture. The portable device equipped with a display panel and a camera may be used to perform an augmented reality (AR) function. Augmented reality is a live direct view of a physical and real-world environment whose elements are augmented or supplemented by computer-generated sensory input such as sound, video, graphics or other information. Augmentation is generally in real-time with environmental elements. With the AR technology, the information about the surrounding real world of the user becomes interactive and digitized. However, the AR experience of the user may be compromised because the image shown on the display is generally constrained by the specification of the camera and cannot always fit the background scene when the viewing distance between the user and the display becomes different.

SUMMARY OF THE INVENTION

A portable device and an operation method thereof are provided in the present invention. An eye-tracking module in the portable device is used to track a user's viewpoint position relative to the portable device for adjusting viewport within images captured by an image capture module in accordance with the user's viewpoint position for generating modified images shown on a display module. Accordingly, the modified images shown on the display module may fit the background scene seen by the user, and the augmented reality experience on the portable device may be improved.

According to an embodiment of the present invention, an operation method of a portable device is provided. The operation method includes the following steps. Images are captured steadily by an image capture module of a portable device. A user's viewpoint position relative to the portable device is tracked. Viewport within the images captured by the image capture module is adjusted in accordance with the user's viewpoint position for generating modified images. The modified images are displayed on a display module of the portable device instantaneously.

According to an embodiment of the present invention, a portable device is provided. The portable device includes a display module, an image capture module, and an eye-tracking module. The image capture module is used to capture images steadily. The eye-tracking module is used to track a user's viewpoint position relative to the portable device. Viewport within the images captured by the image capture module is adjusted in accordance with the user's viewpoint position for generating modified images displayed on the display module instantaneously.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
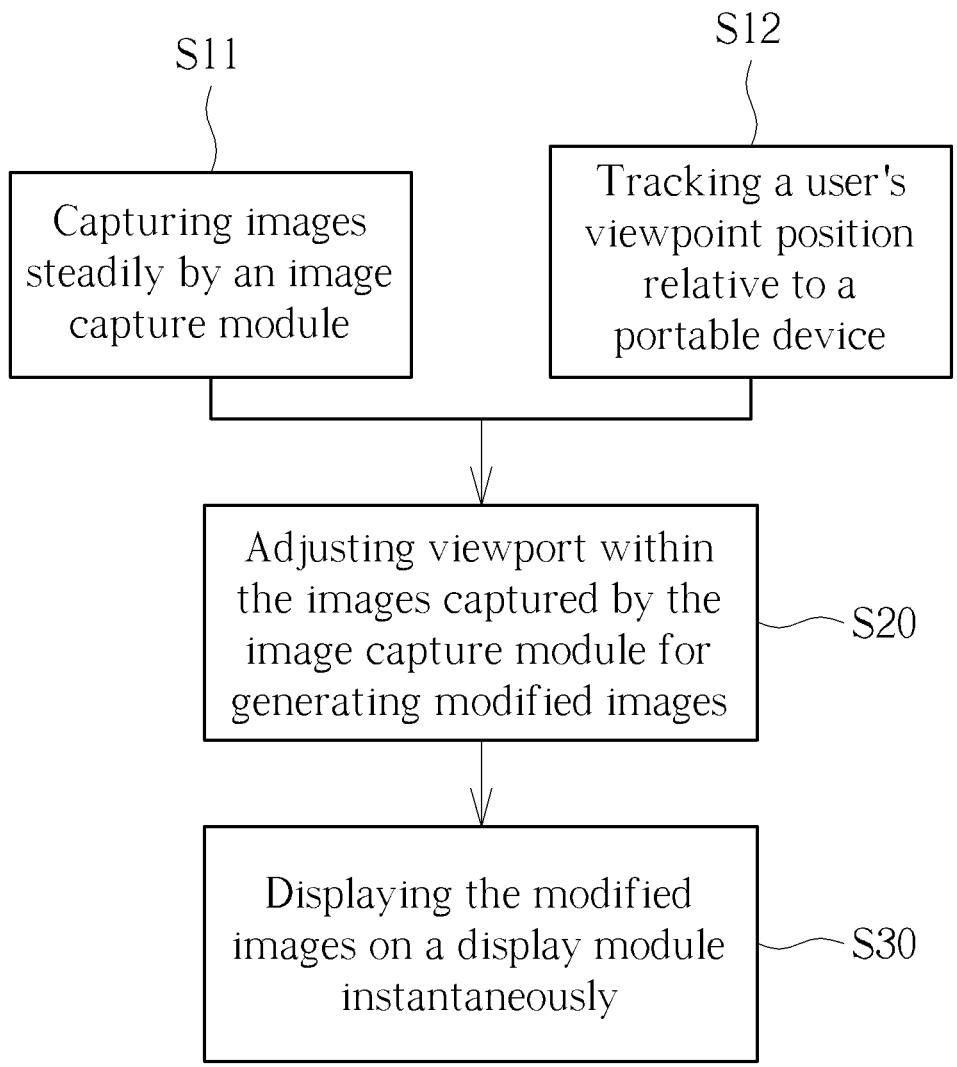
FIG. 1 is a schematic drawing illustrating an operation method of a portable device according to an embodiment of the present invention.

In the following detailed description of the invention, reference is made to the accompanying drawings, which form a part hereof, and in which is shown, by way of illustration, specific embodiments in which the invention may be practiced. These embodiments are described in sufficient detail to enable those skilled in the art to practice the invention. Other embodiments may be utilized and structural changes may be made without departing from the scope of the present invention.

The following detailed description is, therefore, not to be taken in a limiting sense, and the scope of the present invention is defined only by the appended claims, along with the full scope of equivalents to which such claims are entitled. One or more implementations of the present invention will now be described with reference to the attached drawings, wherein like reference numerals are used to refer to like elements throughout, and wherein the illustrated structures are not necessarily drawn to scale.

Figure 2:
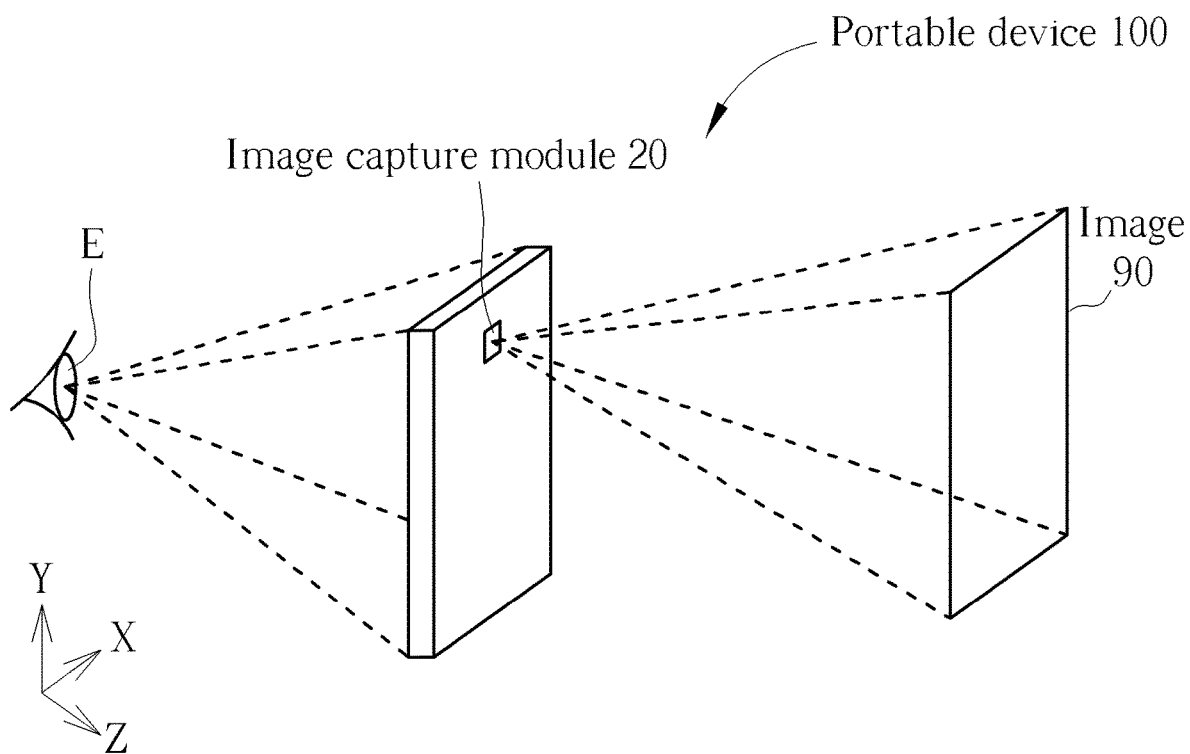
FIG. 2 is a stereoscopic schematic drawing illustrating a portable device according to an embodiment of the present invention.
Figure 3:
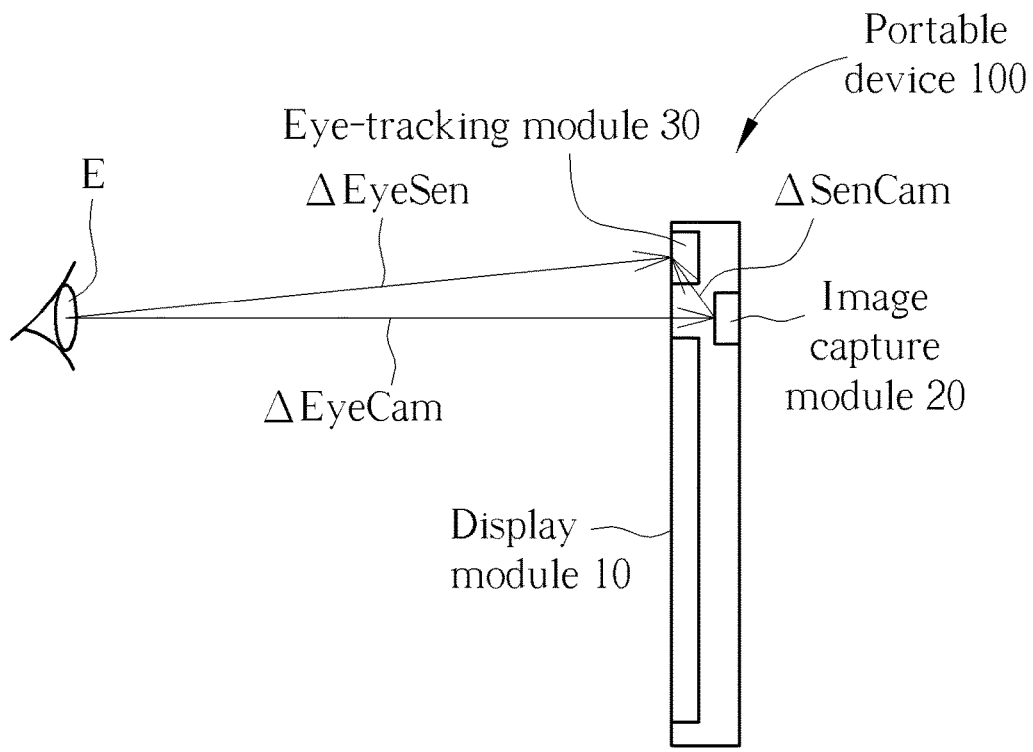
FIG. 3 is a cross-sectional diagram of the portable device according to the embodiment of the present invention.

Please refer to FIG. 1, FIG. 2, and FIG. 3. FIG. 1 is a schematic drawing illustrating an operation method of a portable device according to an embodiment of the present invention. FIG. 2 is a stereoscopic schematic drawing illustrating the portable device in this embodiment. FIG. 3 is a cross-sectional diagram of the portable device in this embodiment. As shown in FIGS. 1-3, an operation method of a portable device 100 includes the following steps. The portable device 100 including a display module 10, an image capture module 20, and an eye-tracking module 30 is provided. The portable device 100 may be a smart phone, a tablet, a handheld game console, or a car navigation system, but not limited thereto. In step S11, images 90 are captured steadily by the image capture module 20 of the portable device 100. In step S12, a user's viewpoint position relative to the portable device 100 is tracked by the eye-tracking module 30. The step S11 and the step S12 may be performed simultaneously. In step S20, viewport within the images captured by the image capture module 20 is adjusted in accordance with the user's viewpoint position for generating modified images. In step S30, the modified images are displayed on the display module 10 of the portable device 100 instantaneously. In other words, the image capture module 20 is used to capture the images steadily. The eye-tracking module 30 is used to track the user's viewpoint position relative to the portable device 100. Preferably, the step of capturing the images by the image capture module 20, the step of tracking the user's viewpoint position, the step of adjusting the viewport within the images captured by the image capture module 20 in accordance with the user's viewpoint position for generating the modified images, and the step of displaying the modified images on the display module 10 may be performed simultaneously for presenting a real-time and live direct view of the environment around the user.

As shown in FIG. 2, the viewpoint of the user is different from the viewpoint of the image capture module 20, and the images captured by the image capture module 20 and displayed on the display module 10 will not fit the background scene seen by the user without modifying the captured images especially when the distance between the user and the portable device 100 changes. However, by the operation method in this embodiment, the modified images displayed on the display module 10 can fit the background scene behind the portable device 100 and seen by the user.

As shown in FIG. 1 and FIG. 3, in some embodiments, the step of tracking the user's viewpoint position may include tracking a distance and an orientation between at least one eye E of the user and the portable device 100, and calculating a distance and an orientation between at least one eye E of the user and the image capture module 20 of the portable device 100. The distance and the orientation between at least one eye E of the user and the image capture module 20 of the portable device may be calculated in accordance with a distance and an orientation between the eye E of the user and the eye-tracking module 30 and a relative position difference between the eye-tracking module 30 and the image capture module 20. For example, ΔEyeCam stands for the distance and the orientation difference between the eye E and the image capture module 20, ΔEyeSen stands for the distance and the orientation difference between the eye E and the eye-tracking module 30, ΔSenCam stands for the distance and the orientation difference between the eye-tracking module 30 and the image capture module 20, and ΔEyeCam may be calculated by an equation listed below.

$$\Delta EyeCam = \Delta EyeSen + \Delta SenCam = (X_{\Delta EyeSen} + X_{\Delta SenCam}, Y_{\Delta EyeSen} + Y_{\Delta SenCam}, Z_{\Delta EyeSen} + Z_{\Delta SenCam})$$

In the above equation, $X_{\Delta EyeSen}$ stands for a position difference between the eye E and the eye-tracking module 30 in X axis, and $X_{\Delta SenCam}$ stands for a position difference between the eye-tracking module 30 and the image capture module 20 in X axis; $Y_{\Delta EyeSen}$ stands for a position difference between the eye E and the eye-tracking module 30 in Y axis, and $Y_{\Delta SenCam}$ stands for a position difference between the eye-tracking module 30 and the image capture module 20 in Y axis; $Z_{\Delta EyeSen}$ stands for a position difference between the eye E and the eye-tracking module 30 in Z axis, and $Z_{\Delta SenCam}$ stands for a position difference between the eye-tracking module 30 and the image capture module 20 in Z axis, wherein ΔSenCam is fixed in the portable device 100, and ΔEyeSen may be measured by the eye-tracking module 30.

In some embodiments, the step of tracking the user's viewpoint position may include tracking a distance and an orientation between each eye of the user and the portable device 100. Additionally, the image capture module 20 may include 3D image capture module, and the modified images displayed on the display module 10 may include naked eye 3D images. The 3D image capture module mentioned above may include a 3D depth camera configured to record position information of objects in the images captured by the image capture module 20. Additionally, the display module 10 may be a naked eye 3D display module, but not limited thereto. Specifically, the images captured by the image capture module 20 may include different images for the left eye and the right eye of the user, and the modified images may include different images displayed on the display module 10 for the left eye and the right eye of the user.

Figure 4:
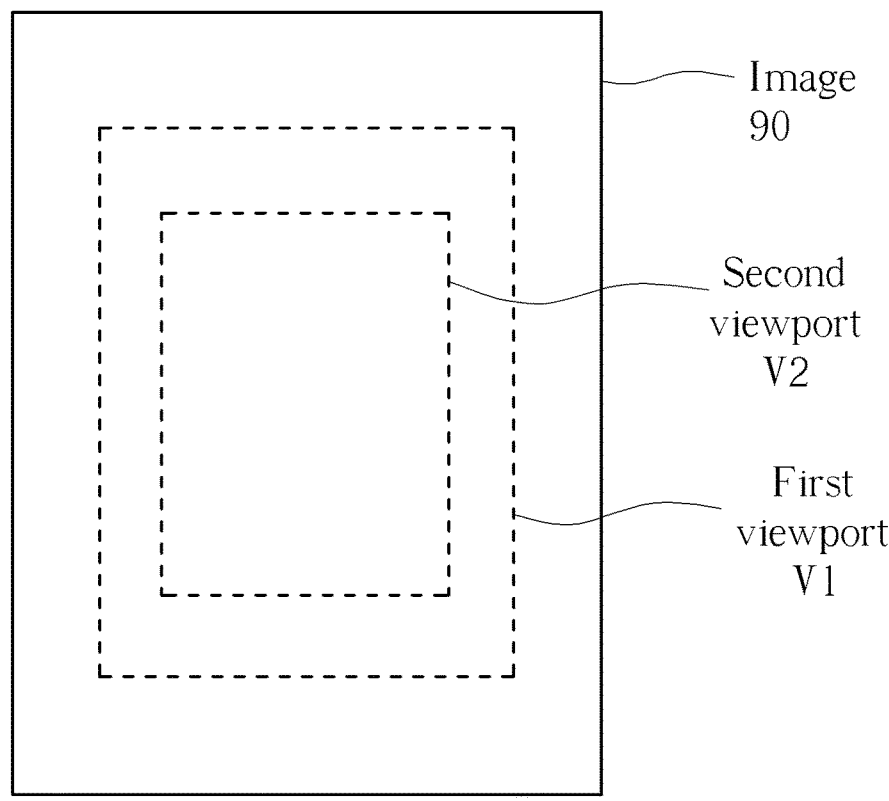
FIG. 4 is a schematic drawing illustrating a step of adjusting viewport within an image captured by an image capture module according to an embodiment of the present invention.

Please refer to FIG. 1, FIG. 3, and FIG. 4. FIG. 4 is a schematic drawing illustrating the step of adjusting viewport within an image captured by the image capture module 20 according to an embodiment of the present invention. As shown in FIG. 1, FIG. 3, and FIG. 4, an image 90 is captured by the image capture module 20, and a first viewport V1 within the image 90 is formed in accordance with the user's viewpoint position for generating and/or rendering a modified image. When the portable device 100 becomes closer to the user's eyes, the viewport within the image is adjusted to be a second viewport V2 shown in FIG. 4. Accordingly, the viewport within the captured image becomes smaller when the distance between the user and the portable device 100 is reduced, and the magnification is increased when the distance between the user and the portable device 100 is reduced. In other words, the captured images are trimmed for generating and/or rendering the modified images displayed on the display module 10 in accordance with the information about the user's viewpoint position relative to the portable device 100 which is tracked by the eye-tracking module 30. The modified images displayed on the display module 10 present a simulated viewpoint similar to that of the user instead of the viewpoint of the image capture module 20.

Figure 5:
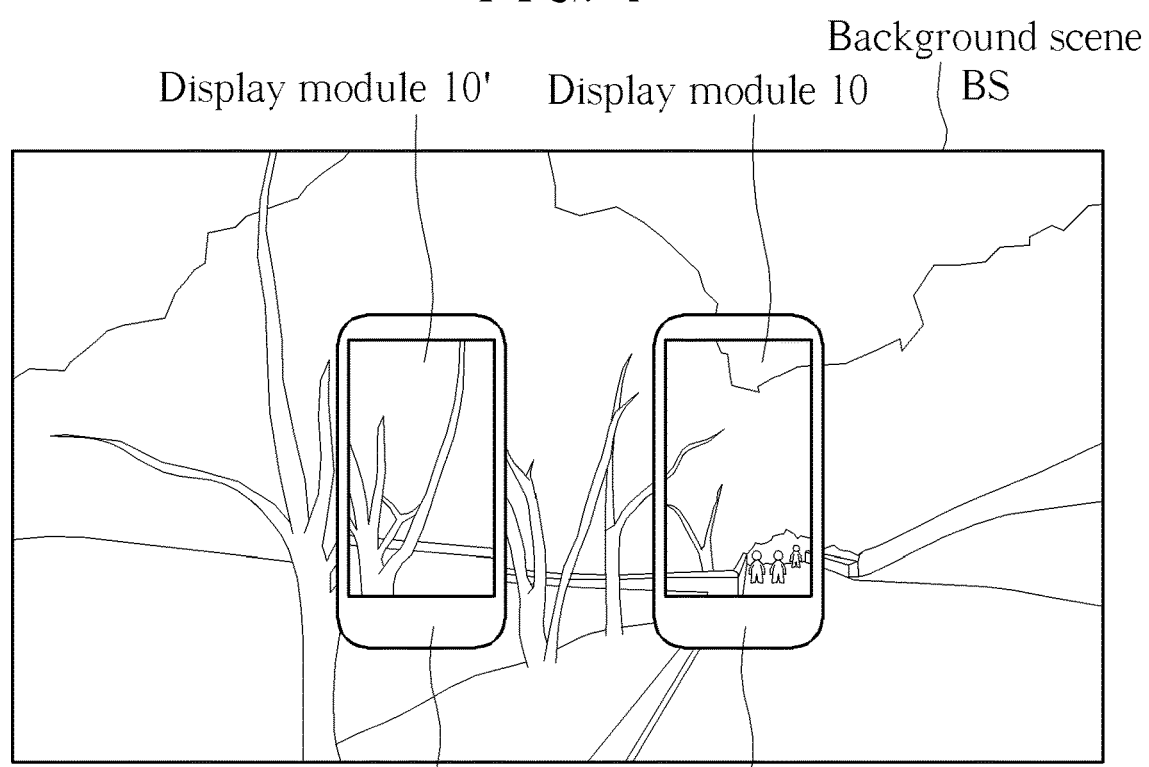
FIG. 5 is a schematic drawing illustrating the difference between an image shown on a display module of a conventional portable device and an image shown on a display module of the portable device according to the embodiment of the present invention.

Please refer to FIG. 3 and FIG. 5. FIG. 5 is a schematic drawing illustrating the difference between an image shown on a display module 10' of a conventional portable device 100' and an image shown on the display module 10 of the portable device 100 in this embodiment. As shown in FIG. 3 and FIG. 5, the image displayed on the display module 10 is the modified image generated by the operation method of the present invention and the image displayed on the display module 10 fit the background scene BS. However, the image displayed on the display module 10' of the conventional portable device 100' does not fit the background scene. Therefore, the user's augmented reality experience on the portable device 100 may be improved.

Figure 6:
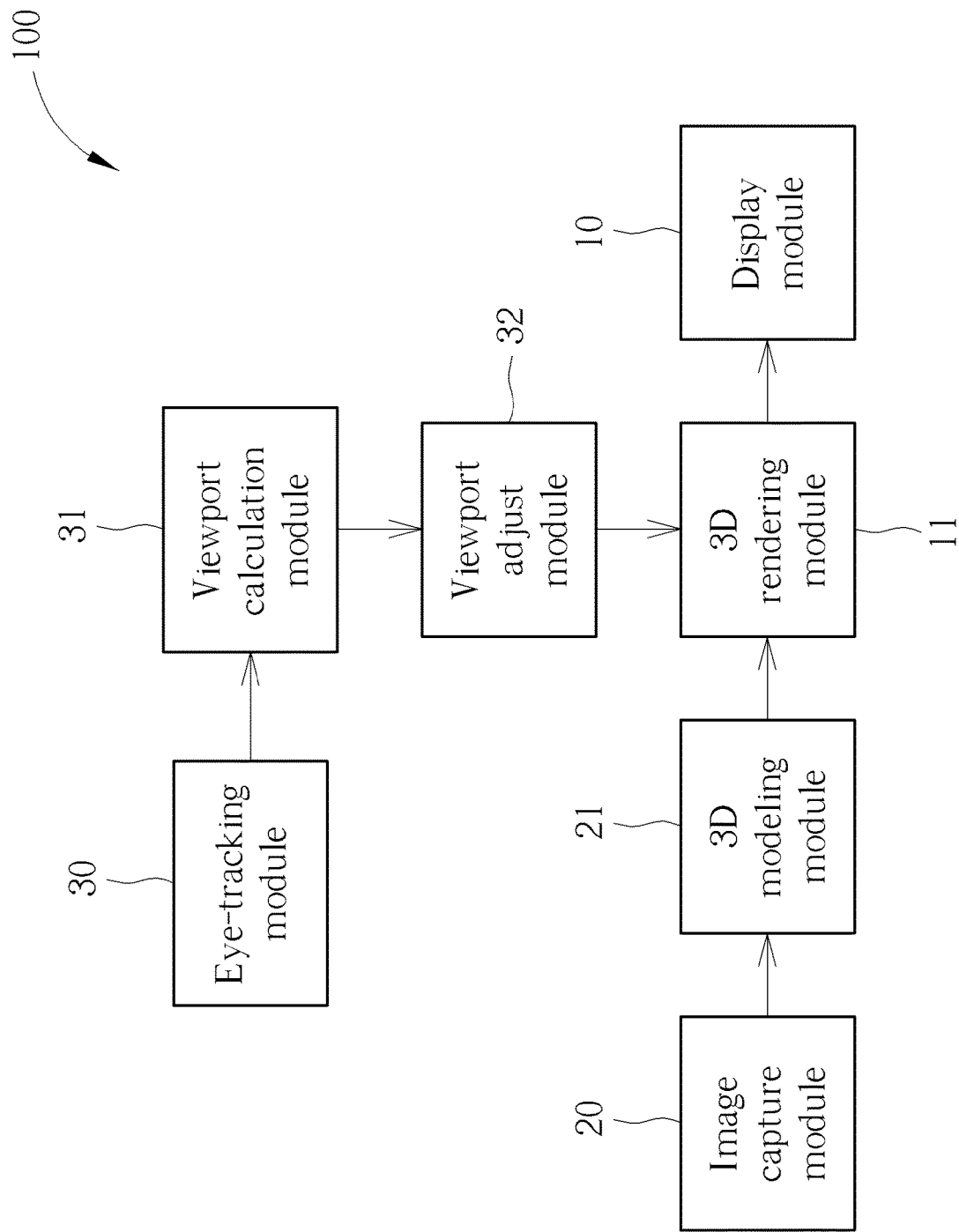
FIG. 6 is a schematic drawing illustrating components in the portable device and interaction between the components according to the embodiment of the present invention.

Please refer to FIG. 3 and FIG. 6. FIG. 6 is a schematic drawing illustrating components in the portable device 100 and interaction between the components according to an embodiment of the present invention. As shown in FIG. 3 and FIG. 6, the display module 10 and the eye-tracking module 30 may be disposed at a front side of the portable device 100, and the image capture module 20 may be disposed at a back side of the portable device 100. The eye-tracking module may include an infrared sensor, or other suitable sensors. As shown in FIG. 3 and FIG. 6, the portable device 100 may further include a viewpoint calculation module 31, a viewport adjust module 32, a 3D modeling module 21, and a 3D rendering module 11. The viewport calculation module 31 is connected to the eye-tracking module 30 and used to calculate the distance and the orientation between at least one eye E of the user and the image capture module 20 of the portable device 100. The 3D modeling module 21 is connected to the image capture module 20 for processing the image data from the image capture module 20. The viewport adjust module 32 is connected to the viewport calculation module 31 and the 3D rendering module 11. The viewport adjust module 32 is used to adjust the viewport within the images captured by the image capture module and input the relation information to the 3D rendering module 11 for generating the modified images.

To summarize the above descriptions, in the portable device and the operation method thereof in the present invention, the user's viewpoint position relative to the portable device is tracked and calculation for adjusting the viewport within the images captured by the image capture module and generating the modified images displayed on the display module. The modified images displayed on the display module may fit the background scene seen by the user, and the augmented reality experience on the portable device may be improved accordingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An operation method of a portable device, comprising:
   capturing images steadily by an image capture module of a portable device;
   tracking a user's viewpoint position relative to the portable device;
   adjusting viewport within the images captured by the image capture module in accordance with the user's viewpoint position for generating modified images; and
   displaying the modified images on a display module of the portable device instantaneously, wherein the modified images displayed on the display module fit a background scene behind the portable device and seen directly by the user without the portable device, and the user sees the background scene behind the portable device not through the display module, wherein magnifications of the images captured by the image capture module are adjusted in order to be displayed on the display module and blend with the background scene seen by the user at the same time, and the magnifications of the images captured by the image capture module are increased when a distance between the user and the portable device is reduced,
   wherein the step of tracking the user's viewpoint position comprises:
      tracking a distance and an orientation between each eye of the user and the portable device, wherein the image capture module comprises a 3D image capture module, and the modified images displayed on the display module comprise naked eye 3D images, wherein the 3D image capture module comprises a 3D depth camera configured to record position information of objects in the images captured by the image capture module, the images captured by the image capture module comprises different images for the left eye and the right eye of the user, and the modified images comprises different images displayed on the display module for the left eye and the right eye of the user,
   wherein the step of capturing the images by the image capture module, the step of tracking the user's viewpoint position, the step of adjusting the viewport within the images captured by the image capture module in accordance with the user's viewpoint position for generating the modified images, and the step of displaying the modified images on the display module are performed simultaneously,
   wherein the images captured by the image capture module are trimmed in order to be displayed on the display module and blend with the background scene seen by the user at the same time when the distance between the user and the portable device is reduced.

* * * * *